United States Patent
Kuo et al.

(10) Patent No.: US 7,580,074 B2
(45) Date of Patent: Aug. 25, 2009

(54) DIGITAL HALFTONING TECHNIQUE BASED ON 1-D MULTI-SCALE DOT ASSIGNMENT

(75) Inventors: Chung-Chieh Kuo, Arcadia, CA (US);
Yih-Feng Chen, Alhambra, CA (US);
Yinqing Zhao, Los Angeles, CA (US);
Lei Huang, Los Angeles, CA (US);
Meng-Yun Yin, Taipei (TW)

(73) Assignee: Primax Electronics Ltd., Neihu Taipei (TW)

( * ) Notice: Subject to any disclaimer, the term of this patent is extended or adjusted under 35 U.S.C. 154(b) by 897 days.

(21) Appl. No.: 11/125,262

(22) Filed: May 10, 2005

(65) Prior Publication Data

US 2006/0256124 A1    Nov. 16, 2006

(51) Int. Cl.
*H04N 5/222* (2006.01)

(52) U.S. Cl. .................. 348/333.01; 358/2.1; 358/306; 358/3.01; 358/3.02; 358/3.03

(58) Field of Classification Search ....... 358/3.01–3.06, 358/2.1, 306; 348/333.01
See application file for complete search history.

(56) References Cited

U.S. PATENT DOCUMENTS

2007/0253030 A1 * 11/2007 Berkner et al. ............... 358/2.1

OTHER PUBLICATIONS

David J. Lieberman and Jan P. Allebach; a Dual Interpretation for Direct Binary Search and Its Implications for Tone Reproduction and Texture Quality;2000—IEEE; pp. 1950-1963.

Ioannis Katsavounidis and C.-C. Jay Kuo; a Multiscale Error Diffusion Technique for Digital Halftoning; 1997—IEEE; pp. 483-490.

J. F. Jarvis and C.S. Roberts; a New Technique for Displaying Continuous Tone Images on a Bilevel Display; Aug. 1976—IEEE; pp. 891-898.

Stefanos Kollias and Dimitris Anastassiou; a Unified Neural Network Approach to Digital Image Halftoning; Apr. 1991—IEEE; pp. 980-984.

Ping Wah Wong; Adaptive Error Diffusion and its Application in Multiresolution Rendering; Jul. 1996—IEEE; pp. 1184-1196.

Hirobumi Nishida; Adaptive Model-Based Digital Halftoning Incorporating Image Enhancement; 2000—IEEE; pp. 306-309.

Niranjan Damera-Venkata and Brian L. Evans; Adaptive Threshold Modulation for Error Diffusing Halftoning; 2001—IEEE; pp. 104-116.

R.L. Stevenson and G.R. Arce; Binary Display of Hexagonally Sampled Continuous-Tone Images; 1985 Optical Society of America; pp. 1009-1013.

(Continued)

*Primary Examiner*—Sinh Tran
*Assistant Examiner*—Anthony J Daniels
(74) *Attorney, Agent, or Firm*—Bacon & Thomas, PLLC

(57) ABSTRACT

A line-based digital halftoning technique uses both a wavelet transform and multi-scale dot assignment concepts in which the dots are assigned in a top-down fashion and error diffusion is also adopted to fine tune the halftoned images and compensate for errors generated by the implicit quantization. 1-D processing makes the implementation easy while the top-down multiscale dot assignment can produce a multi-resolution halftoned image, which provides a good approximation of the original in multiple scales.

14 Claims, 4 Drawing Sheets

OTHER PUBLICATIONS

Daniel L. Lau, Robert Ulichney and Gonzalo R. Arce; Blue- and Green-Noise Halftoning Models; Jul. 2003—IEEE Signal Processing Magazine; pp. 28-38.

Niranjan Damera-Venkata, Brian L. Evans and Vishal Monga; Color Error-Diffusion Halftoning; 2003—IEEE; pp. 51-58.

Bernard Lippel; Comments on "a New Technique for Displaying Continuous Tone Images on a Bilevel Display"—1978—IEEE; pp. 309-310.

Daniel L. Lau, Gonzalo R. Arce and Neil C. Gallagher; Digital Halftoning by Means of Green-Noise Masks; 1999—Optical Society of America; pp. 1575-1586.

Theophano Mitsa and Kevin J. Parker; Digital Halftoning Technique Using a Blue-Noise Mask; 1992 Optical Society of America; pp. 1920-1929.

Donald E. Knuth; Digital Halftones by Dot Diffusion; ACM Transactions on Graphics—vol. 6, No. 4, Oct. 1998—pp. 245-273.

Robert A. Ulichney; Dithering With Blue Noise; Proceedings of the IEEE, vol. 76, No. 1, Jan. 1988—pp. 56-79.

Zhigang Fan and Fu Li: Edge Behavior of Error Diffusion; 1995—IEEE, pp. 113-116.

Daniel L. Lau, Gonzalo R. Arce and Neal C. Gallagher; Green Noise Digital Halftoning; 1998—IEEE; pp. 39-43.

Daniel L. Lau, Gonzalo R. Arce and Neal C. Gallagher, Green-Noize Digital Halftoning; 1998—IEEE; pp. 2424-2444.

Zixiang Xiong, Michael T. Orchard and Kannan Ramchandran; Inverse Halftoning Using Wavelets; 1999—IEEE; pp. 1479-1483.

Thrasyvoulos N. Pappas and David L. Neuhoff; Least-Squares Model-Based Halftoning; 1999—IEEE; pp. 1102-1116.

Kevin E. Spaulding, Rodney L. Miller and Jay S. Schildkraut; Method for Generating Blue-Noise Dither Matrices for Digital Halftoning; Apr. 1997—The International Society for Optical Engineering.

Thrasyvoulos N. Pappas, Jan P. Allebach and David L. Neuhoff; Model-Based Digital Halftoning; Jul. 2003—IEEE Signal Processing Magazine; pp. 14-27.

Ramesh Neelamani, Robert Nowak and Richard Baraniuk; Model-Based Inverse Halftoning With Wavelet-Vaguellet Deconvolution; 2000—IEEE, pp. 973-976.

Joan L. Mitchell, Gehard Thompson, Chai Wah Wu; Multilevel Color Halftoning; IBM Research Report—Dec. 4, 2001; pp. 1-6.

Eli Peli; Multiresolution, Error-Convergence Halftone Algorithm; 1991 Optical Society of America; pp. 625-636.

Harold Szu, Yingping Zhang, Mingui Sun, Ching-Chung Li; Neural Network Adaptive Digital Image Screen Halftoning (Dish) Based on Wavelet Transform Preprocessing; Proceedings of 1993 International Joint Conference on Neural Networks—pp. 1215-1218.

Reiner Eschbach, Zhigang Fan, Keith T. Knox and Gabriel Marcu; Threshold Modulation and Stability in Error Diffusion; 2003—IEEE; pp. 39-50.

Pingshan Li and Jan P. Allebach; Tone-Dependent Error Diffusion; 2004—IEEE, pp. 201-215.

Chunghui Kuo, A. Ravishankar Rao and Gerhard Thompson; Wavelet Based Halftone Segmentation and Descreening Filter Design; 2001—IEEE, pp. 1573-1576.

\* cited by examiner

FIG. 1
(PRIOR ART)
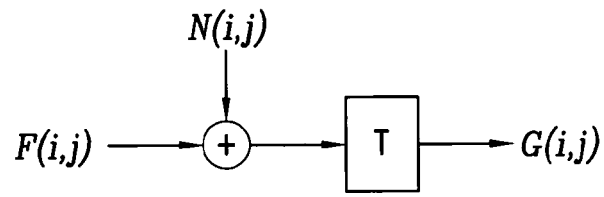
FIG. 2
(PRIOR ART)
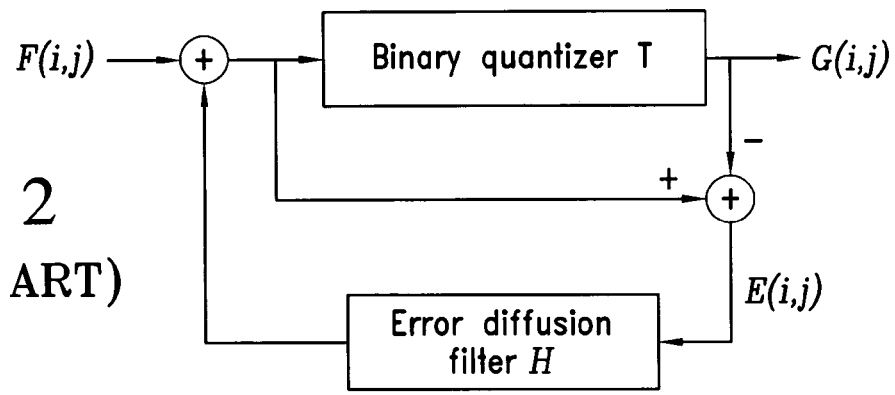
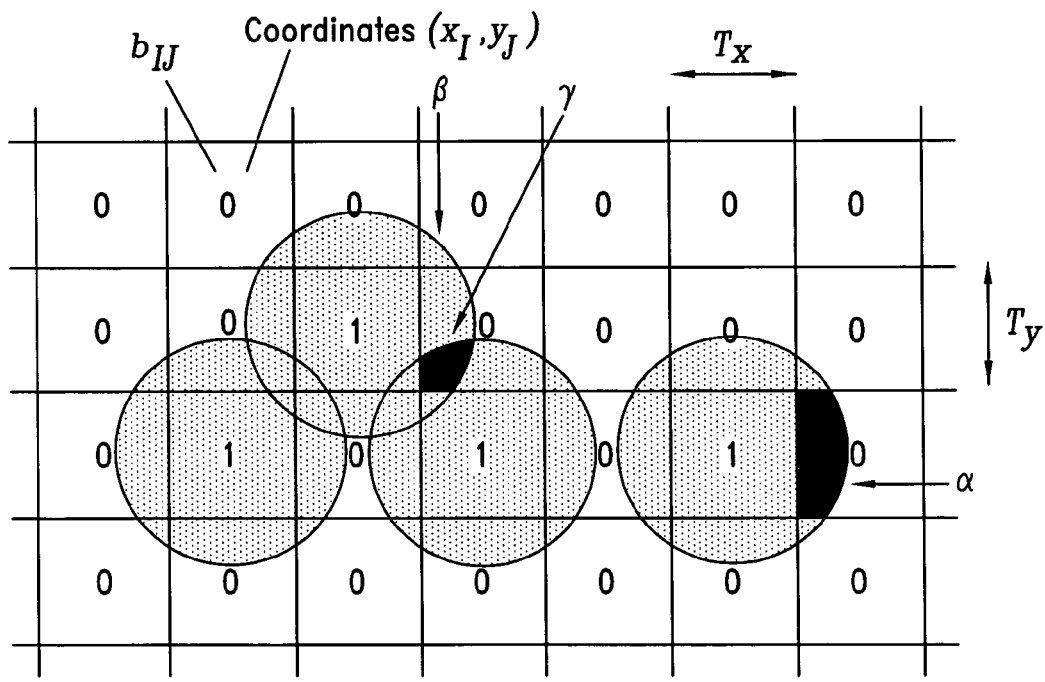
FIG. 3
(PRIOR ART)

Wavelet function:

$$\psi(\chi)= \begin{cases} 1, & \text{if } \chi \in [0,0.5] \\ -1, & \text{if } \chi \in [0.5,1], \\ 0, & \text{others} \end{cases}$$

DIGITAL HALFTONING TECHNIQUE BASED ON 1-D MULTI-SCALE DOT ASSIGNMENT

BACKGROUND OF THE INVENTION

1. Field of the Invention

This invention relates to a line-based halftoning process, involving the steps of:

a. performing a wavelet analysis for one row of pixels of the input image; and b. performing a halftoning algorithm to generate the corresponding output row.

The halftoning algorithm contains two main phases:

a. a top-down dot assignment phase in which dots are assigned a new luminance value based on the wavelet analysis; and b. an error diffusion phase in which the dot assignment is compared with the original luminance value and the quantization error is diffused to the pixel in the next one or several lines.

In the dot assignment phase, the proposed halftoning scheme adopts a dot assignment approach that mimics the results from the 1-D wavelet analysis. This is distinct from the pixel-by-pixel dot assignment approach in most existing halftoning algorithms.

In the error diffusion phase, the dot assignment is compared with the original luminance value and the quantization error diffused to the pixels in the next one or several lines (i.e. lines below the current line) as a local feedback mechanism to further improve visual quality.

Finally, post-processing techniques are employed to remove the artificial patterns.

2. Description of Related Art

Digital halftoning is a technique that renders a continuous-tone image effect on printing or display devices that can only represent a limited number of output tones. To represent each gray level, the halftoning algorithm generates a pattern of textures that, when perceived by the human viewer, has the appearance of a constant gray value. These patterns are locally modulated to represent details of the image naturally.

The following considerations must be taken into account in designing a halftoning algorithm:

A. Good visual effect. The generated image should appear to the viewer as similar to the continuous-tone original image as possible. Moreover, the good visual effect should be achieved under different level of details (LoD), which corresponding to different resolutions of the printing or the display devices.

B. Efficient implementation. In order to be implemented in real devices, it is important that the computational complexity and the memory space requirements of the algorithm are low.

Existing digital halftoning techniques can be classified into three main categories: (1) iterative optimization, (2) dithering, and (3) error diffusion. Each of these techniques, as well as combinations of the techniques, has its own advantages and shortcomings. Generally speaking, since the iterative optimization technique demands a much higher computational cost, it is mainly of academic interest. Dithering and error diffusion are two categories that are studied more extensively as a practical approach for industrial implementation. Both approaches can be further improved to be an adaptive halftoning technique. In adaptive halftoning, the thresholds and filter weights can be adjusted according to input pixel values. A brief review of these three techniques follows.

A. Iterative Optimization

Iterative optimization methods attempt to minimize the perceived error between the continuous-tone image and the halftoned image according to some underlying models, such as the human visual system (HVS). The error is usually calculated by a weighted least square approach. Halftone images derived by this type of techniques usually have high quality at the cost of computational complexity. One example is the direct binary search addressed in D. J. Lieberman and J. P. Allebach, "A dual interpretation for direct binary search and its implications for tone reproduction and texture quality," *IEEE Transaction of Image Processing*, vol. 9, pp. 1352-1366, November 2000.

B. Dithering and Screening

Dithering provides another type of halftoning technique that adds noise to images prior to the quantization. Noise is introduced to break the monotonicity of error accumulation in the area of constant gray levels so that halftoned images are more similar to original ones. The process is shown in FIG. 1.

While white noise is a commonly known type of noise in random processes, it is not used in halftoning because it generates clustered dots, which degrades the visual quality of halftoned images. Blue noise and green noise are usually chosen in the literature of dithering, especially blue noise. One characteristic of blue noise is that it is exclusively high-frequency noise. Due to the low-pass nature of human eyes, the high frequency blue noise is least visible to the human viewer (see, R. A. Ulichney, "Digital halftoning," *MIT Press*, 1987; and R. A. Ulichney, "Dithering with blue noise," *Proceedings of IEEE*, vol. 76, pp. 56-79, January 1988. However, dithering with blue noise does not function well for printing devices that cannot reproduce dots consistently from dot to dot, such as laser printers. Instead, as explained in D. L. Lau, G. R. Arce, and N. C. Gallagher, "Green-noise digital halftoning," *Proceeding of IEEE*, vol. 86, pp. 2424-2444, December 1998, green noise, which consists of signals in mid-frequencies. Additional details are found in D. L. Lau, R. Ulichney, and G. R. Arce, "Blue- and green-noise halftoning models," *IEEE Signal Processing Magazine*, pp. 28-38, July 2003.

In practice, adding noise prior to halftoning is not an efficient approach in implementation because of the need of pseudo-random numbers, which have to be generated on-line or be stored. For this reason, it is rare to implement dithering as a direct noise adding process in industry. Instead, dithering serves as a model for understanding and has to be implemented by other algorithms that achieve the equivalent effect.

Screening, on the other hand, is a type of halftoning method that is popular in practical implementation. A screen is a matrix of thresholds applied to an image periodically. To take advantage of both screening techniques and blue and green noise, blue noise masks and green noise masks may be used, as disclosed for example in T. Mitsa and K. J. Parker, "Digital halftoning technique using a blue noise mask," *J. Opt. Soc. Amer.*, vol. 9, pp. 1920-1929, 1998; K. E. Spaulding, R. L. Miller, and J. Schildkraut, "Methods for generating blue-noise dither matrices for digital halftoning," *J. Electron. Imaging*, vol. 6, no. 2, pp. 208-230, 1997; and D. L. Lau, G. R. Arce, and N. C. Gallagher, "Digital halftoning by means of green-noise masks," *J. Opt. Soc. Amer.*, vol. 16, pp. 1575-1586, July 1999. The void-and-cluster method is the most famous way to create masks, as is described in R. A. Ulichney, "The void-and-cluster method for dither array generation," *Proceeding of SPIE, Human Vision, Visual Processing, Digital Displays IV*, vol. 1913, pp. 332-343, 1993. Since screening is a low complexity halftoning technique, it is commonly used in industry (see, U.S. Pat. No. 5,726,772).

C. Error Diffusion

The error diffusion approach was first proposed by R. W. Floyd and L. Steinberg in "An adaptive algorithm for spatial grey scale," *Proceedings of Society of Information Display International Symposium Digest of Technical Papers*, pp. 36-37, March 1975. The basic idea is to take care of errors introduced in the quantization process using a self-correcting feedback system. Errors are diffused to unprocessed neighbor pixels. The error diffusion process is shown in FIG. 2.

When viewed by humans, halftone images generated by error diffusion appear to be more similar to original ones. The textures are smoother. However, error diffusion does leave some artifacts such as moiré patterns and the directional hysteresis. The moiré pattern is the result of superimposing regular patterns on an image. To overcome the unpleasant moiré pattern, the size of error diffusion filters is enlarged and different weight values are assigned, as disclosed for example in J. Jarvis and C. Roberts, "A new technique for displaying continuous tone images on a bilevel display," *IEEE Transactions on Communications*, pp. 891-898, August 1976; J. Jarvis, C. Judice, and W. Ninke, "A survey of techniques for the display of continuous tone pictures on bilevel displays," *Computer Graphics and Image Processing*, vol. 5, pp. 13-40, 1976; and P. Stucki, "Meccaxa multiple-error correcting computation algorithm for bilevel hardcopy reproduction," Research Report RZ1060, *IBM Research Laboratory*, 1981. Another way to reduce artifacts is to use a serpentine scan instead of the raster scan, as described in R. A. Ulichney, "Dithering with blue noise," *Proceeding of IEEE*, vol. 76, pp. 56-79, January 1988; and I. Witten and R. Neal, "Using peano curves for bilevel display of continuous-tone images," *IEEE Computer Graphics and Applications*, pp. 47-51, May 1982.

D. Adaptive Techniques

Dithering, screening, and error diffusion have recently been enhanced to be adaptive to the content of images. Generally speaking, adaptivity is achieved by making thresholds and filter weights variable. To achieve adaptation, several factors are considered: (1) pixel values, (2) edge behaviors and (3) human visual systems (HVS).

Since halftoning changes an image from the gray scale to a binary scale, edge behaviors between input and output images become different. Consistency has therefore been a focus of research in the area of adaptive halftoning techniques. By testing different filters adopted by error diffusion, Z. Fan and F. Li ("Edge behavior of error diffusion," *Proceedings of IEEE International Conference on Image Processing*, pp. 113-116, October 1995) discovered that, while most of the time edges are enhanced, they are blurred sometimes. Thus, they proposed a nonlinear edge enhancement technique, where HVS factors are used to exploit the low-pass characteristics of human eyes.

There is work about adaptive halftoning based on the least squares error criterion with HVS. In that case, the halftoning is adjusted according to local pixel values, as disclosed in H. Nishida, "Adaptive model-based digital halftoning incorporating image enhancement," *Proceedings of 15th International Conference on Pattern Recognition*, vol. 3, pp. 306-309, September 2000. In the method disclosed in U.S. Pat. No. 6,760,126, a pixel is dithered twice with two different masks and has two temporary outputs, which are combined according to edge activities and suppression parameters. In this way, the method is adaptive to images with both low and high activities. Since dithering is not a mainstream halftoning technique, there is relatively little work on adaptive dithering in the literature.

There exists more work on adaptive error diffusion, either with several fixed filters or with tone-dependent filters. U.S. Pat. Nos. 5,737,453 and 6,356,362 proposed a method that applies several different matrices according to gray values, for example, a two-term matrix for extreme gray levels and a four-term matrix for midtones. Matrices in midtone-to-extreme gray level transitions are obtained by interpolation. The error diffusion approach was enhanced based on the HVS and the edge behavior described in U.S. Pat. No. 6,563,957 and P. Li and J. P. Allebach, "Tone-dependent error diffusion," *IEEE Transactions on Image Processing*, vol. 13, no. 2, pp. 201-215, February 2004. A tone dependent threshold was developed so that the edge effect and the start-up delay can be reduced.

A parallel scan with variable weights has also adopted to reduce artifacts. P. W. Wong ("Adaptive error diffusion and its application in multiresolution rendering," *IEEE Transaction on Image Processing*, vol. 5, no. 7, pp. 1184-1196, July 1996) considered more than one fixed error diffusion filter, where the filters were adjusted during the halftoning process. The objective is to minimize the error, and the implementation is done using the least mean squares (LMS) algorithm from adaptive signal processing. Another advantage of P. D. Wong's work, described in P. W. Wong, "Adaptive error diffusion and its application in multiresolution rendering," *IEEE Transaction on Image Processing*, vol. 5, no. 7, pp. 1184-1196, July 1996, is that it can offer multi-resolution rendering.

Using either dithering or error diffusion technique alone has some shortcomings. The halftoning method described in U.S. Pat. No. 5,970,178 attempts to use advantages of both approaches. Regions are evaluated by some methods first. If the region is "busy" and "rich", i.e. with detailed information, the error diffusion method is applied. Otherwise, a smooth dithering method is used. Adaptive halftoning with error diffusion can also be achieved with variable dot sizes, as described in U.S. Pat. No. 6,778,299.

There are studies on adaptive thresholds such as those described in N. Damera-Venkata and B. L. Evans, "Adaptive threshold modulation for error diffusion halftoning," *IEEE Transactions on Image Processing*, vol. 10, no. 1, pp. 104-116, January 2001; and U.S. Pat. No. 5,268,774. In the Damera-Venkata and Evans article, the quantization process was modeled implicitly so that a wide variety of quantizers can be used. In the method described in U.S. Pat. No. 5,268,774, the dither pattern, the pixel value, pixel values and an edge enhancement technique are used to decide the threshold value. A survey on the improvement of error diffusion using different threshold modulation schemes is given in R. Eschbach, Z. Fan, K. T. Knox, and G. Marcu, "Threshold modulation and stability in error diffusion," *IEEE Signal Processing Magazine*, pp. 39-50, July 2003.

Although adaptive halftoning techniques provide more pleasant visual results, their actual effects vary from printer to printer. This is because printers have different printing capabilities, dot sizes and dot shapes. For example, some laser printers have a problem in printing dots consistently from one to the other. Other phenomena common to most printing devices are dot overlap and dot gain. Printers may produce some circular dots that overlap adjacent ones, which is called the dot overlap effect. Furthermore, printers may produce dots that appear larger than required, which is called the dot gain. These concepts are illustrated in FIG. 3. Consequently, it is important to study halftoning techniques based on the printing model, as described for example in U.S. Pat. No. 5,592,592; T. N. Pappas and Neuhoff, "Least-squares model-based halftoning," *IEEE Transactions on Image Processing*, vol. 8, no. 8, pp. 1102-1116, August 1999; and T. N. Pappas, J. P. Allebach, and D. L. Neuhoff, "Model-based digital halftoning," *IEEE Signal Processing Magazine*, pp. 14-27, July 2003.

D. Color Halftoning

In addition to the halftoning techniques discussed above, which are for gray-scale images, halftoning techniques for color images are important too. There exist more than on color image system, each with multiple colorant planes, such as the CMYK (cyan, magenta, yellow, and black) or the RGB (red, green and blue) systems. The error diffusion technique developed for gray scale halftoning cannot be applied to color images directly since human eyes have different sensitivities to different frequencies of different colorant planes. Therefore, while each colorant channel should be considered separately, the interaction between different channels must be examined as well. Issues of color halftoning are addressed in J. L. Mitchell, G. Thompson, and C. W. Wu, "Multilevel color halftoning," *IBM Research Report*, December 2001; U.S. Pat. No. 6,501,564, December 2002; and N. Damera-Venkata, B. L. Evans, and V. Monga, "Color error-diffusion halftoning," *IEEE Signal Processing Magazine*, pp. 51-58, July 2003.

F. Multi-resolution Approach

The final two categories of halftoning techniques are wavelet-based and multi-resolution-based halftoning techniques. The wavelet transform has been used in inverse halftoning, as described in Z. Xiong, M.T. Orchard, and K. Ramchandran, "Inverse halftoning using wavelets," *IEEE Transaction on Image Processing*, vol. 8, no. 10, pp. 1479-1483, October 1999; R. Neelamani, R. Nowak, and R. Baraniuk, "Model-based inverse halftoning with wavelet-vaguelette deconvolution," Proceedings of 2000 *IEEE International Conference on Image Processing*, vol. 3, pp. 973-976, September 2000; and C. Kuo, A. Ravishankar Rao, and G. Thompson, "Wavelet based halftone segmentation and descreening filter design," Proceedings of 2001 *IEEE International Conference on Acoustics, Speech, and Signal Processing (ICASSP)*, vol. 3, pp. 1573-1576, May 2001. Inversed halftoning converts a two-tone image to a continuous-tone image. A new approach to inverse halftoning using non-orthogonal wavelets is addressed in Z. Xiong, M.T. Orchard, and K. Ramchandran, "Inverse halftoning using wavelets," *IEEE Transaction on Image Processing*, vol. 8, no. 10, pp. 1479-1483, October 1999. This technique is sometimes called descreening or unscreening (See, U.S. Pat. Nos. 5,799,112 and 6,738,524.

The wavelet transform has also been used in the preprocessing stage as described in H. Szu, Y. Zhang, M. Sun, and C.-C. Li, "Neural network adaptive digital image screen halftoning (dish) based on wavelet transform preprocessing," *SPIE Proceeding*, vol. 2242, pp. 963-966, April 1994; and H. Szu, Y. Zhang, M. Sun, and C.-C. Li, "Neural network adaptive digital image screen halftoning (dish) based on wavelet transform preprocessing," *Proceedings of 1993 International Joint Conference on Neural Networks (IJCNN)*, vol. 2, pp. 1215-1218, October 1993. Since the wavelet transform provides a mechanism to achieve both spatial and frequency localization, it is a good tool for image analysis. The wavelet transform is used to find the frequency information, which is further utilized to control the screening function.

The method described in the Szu et al. articles uses two-dimensional wavelet transform as well as the neural network technology. Thus, it demands a large storage space and a significant amount of computation. The present invention also uses wavelet analysis, but the approach is very different from theirs. Only the one-dimensional wavelet transform is applied in the algorithm of the invention. Furthermore, the wavelet analysis of the invention is used for dot assignment rather than screening function control.

There are a few papers on multi-resolution halftoning, including P.W. Wong, "Adaptive error diffusion and its application in multiresolution rendering," *IEEE Transaction on Image Processing*, vol. 5, no. 7, pp. 1184-1196, July 1996; and I. Katsavounidis and C.-C. Jay Kuo, "A multiscale error diffusion technique for digital halftoning," *IEEE Transaction on Image Processing*, vol. 6, no. 3, pp. 483-490, March 1997. The multi-resolution halftoning concept was introduced to create halftones, and a multiscale error diffusion process was proposed in H. Szu, Y. Zhang, M. Sun, and C.-C. Li, "Neural network adaptive digital image screen halftoning (dish) based on wavelet transform preprocessing," *SPIE Proceeding*, vol. 2242, pp. 963-966, April 1994, and in the Katsavounidis and Kuo article. First, it demands a two-dimensional processing which demands a large memory space. Second, it uses the pixel-by-pixel dot assignment scheme, which is not very efficient. Another multi-resolution method was discussed in [23].

The algorithm of the present invention uses both the wavelet transform and multi-scale dot assignment concepts. However, it is different from previous work in the following aspects. The halftoning process is line-based and dots are assigned in a top-down fashion. Error diffusion is also adopted to fine tune the halftoned images to compensate errors generated by the implicit quantization. The 1-D processing makes the implementation easy while the top-down multiscale dot assignment can produce a multi-resolution halftoned image, which provides a good approximation of the original in multiple scales.

SUMMARY OF THE INVENTION

It is accordingly a first objective of the invention to provide a halftoning method which provides a good visual effect and efficient implementation, and in which the generated image appears to the viewer as similar to the continuous-tone original image as possible.

It is a second objective of the invention to provide a halftoning method in which the good visual effect is achieved under different level of detail (LoD), which corresponding to different resolutions of the printing or the display devices.

It is a third objective of the invention to provide a halftoning method in which the computational complexity and the memory space requirements of the algorithm are low.

The halftoning technique of the invention uses wavelet analysis to set dot assignments. In this dot assignment phase, the proposed halftoning scheme adopts a dot assignment approach by mimicking the results from the 1-D wavelet analysis. This is distinct from the pixel-by-pixel dot assignment approach in most existing halftoning algorithms.

In addition, the halftoning technique of the invention may include an error diffusion phase. In the error diffusion phase, the dot assignment is compared with the original luminance value and diffuse the quantization error diffused to the pixels in the next one or several lines (i.e. lines below the current line) as a local feedback mechanism to further improve visual quality.

Finally, following the dot assignment phase, and/or the optional error diffusion phase, post-processing techniques may be employed to remove the artificial patterns.

The use of wavelet analysis in the design of the new halftoning algorithm takes advantage of the capability of wavelet analysis to capture both spatial and frequency domain information of an input signal. The output halftoned image preserves low frequency components of the input image. At the same time, the details of the input image in local areas, such as edges and textures, are also well preserved. The preferred embodiment presents a mechanism for dot assignment that resembles the wavelet coefficients well so that the dot density (or ink density) is proportional to the magnitude of wavelet coefficients at various scales.

BRIEF DESCRIPTION OF THE DRAWINGS

FIG. 1 is a schematic diagram of a conventional dithering process.

FIG. 2 is a schematic diagram of a conventional error diffusion process.

FIG. 3 illustrates dot overlap and dot gain effects to which some conventional printers are subject.

FIG. 6($b$) is a schematic illustration of the tree decomposed wavelet coefficients of an input sequence.

FIG. 7($b$) is a row extracted from the input image of FIG. 6($a$).

DETAILED DESCRIPTION OF THE PREFERRED EMBODIMENTS

General Principles

The invention is a line-based halftoning process involving the steps of performing a wavelet analysis for one row of pixels of the input image, and performing a halftoning algorithm to generate the corresponding output row.

Figure 4:
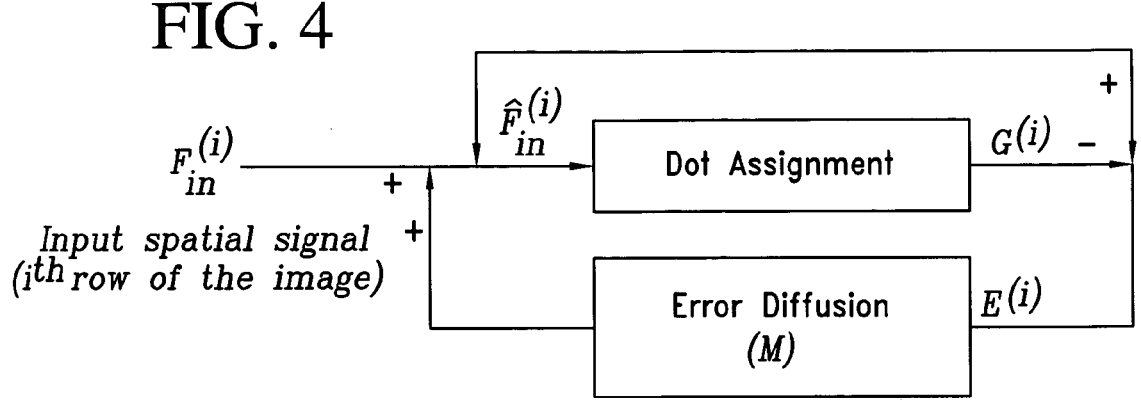
FIG. 4 is a schematic diagram which provides an overview of the halftoning method of the invention.

As illustrated in FIG. 4, the halftoning method of the preferred embodiment of the invention involves a top-down dot assignment phase in which dots are assigned a new luminance value based on the wavelet analysis. In addition, the preferred embodiment may include an optional error diffusion phase in which the dot assignment is compared with the original luminance value and the quantization error is diffused to the pixel in the next one or several lines.

Those skilled in the art will appreciate that both the wavelet transform and multi-scale dot assignment concepts used by the preferred method are in general known. However, the method of the invention is different from previous work utilizing wavelet analysis and multi-scale dot assignment in that the halftoning process is line-based and dots are assigned in a top-down fashion. Error diffusion is adopted to fine tune the halftoned images and compensate errors generated by the implicit quantization, although methods other than error diffusion may be used for this purpose. The 1-D processing makes the implementation easy while the top-down multi-scale dot assignment can produce a multi-resolution halftoned image, which provides a good approximation of the original in multiple scales.

In the method illustrated in FIG. 4, $F_{in}$ is used to denote the input gray-level image of size $M_i \times N_i$, where the image size is defined in terms of the number of pixels (i.e. the input image has $N_i$ pixels in a row and $M_i$ pixels in a column). Each pixel takes a normalized gray level whose value can be any number between 0 and 1, with 0 corresponding to the brightest gray level (pure white) and 1 the darkest gray level (pure black).

On the other hand, $F_{out}$ is used to denote the output halftoned image of size $M_o \times N_o$. Each pixel in the output image only takes a binary value of either 0 or 1. For the ink jet printer's implementation, $F_{out}$ serves as a roadmap to control a series of nozzles in the print head. When $F_{out}(i, j)=1$, the nozzle spays a drop of black ink (or a dot) at position (i, j); when $F_{out}(i, j)=0$, there is no ink spayed out. Hence, the digital halftoning process can be seen as an approximation process to generate the output binary image $F_{out}$ with a dot density distribution that is similar to gray level densities of the input gray-level image $F_{in}$.

Usually, the output image size is larger than the input image size, i.e. $M_o >> M_i$ and $N_o >> N_i$. Without loss of generality, it may be assumed that $M_o = M_i$ and $N_o = N_i$, since one can always interpolate the input image so as to make the input and output images have the same image dimension.

A more detailed discussion of the various steps of the preferred halftoning process follows. However, those skilled in the art will appreciate that the specific wavelet analysis, dot assignment, and error diffusion techniques described below are by way of example only, and that it is within the scope of the invention to vary these techniques or substitute other techniques that accomplish the same overall functions.

Input and Output Image Definitions

In the illustrated embodiment, $F_{in}$ is used to denote the input gray-level image of size $M_i \times N_i$, where the image size is defined in terms of the number of pixels (i.e. the input image has $N_i$ pixels in a row and $M_i$ pixels in a column). Each pixel takes a normalized gray level whose value can be any number between 0 and 1, with 0 corresponding to the brightest gray level (pure white) and 1 the darkest gray level (pure black).

On the other hand, $F_{out}$ is used to denote the output halftoned image of size $M_o \times N_o$. Each pixel in the output image only takes a binary value of either 0 or 1. For the ink jet printer's implementation, $F_{out}$ serves as a roadmap to control a series of nozzles in the print head. When $F_{out}(i, j)=1$, the nozzle spays a drop of black ink (or a dot) at position (i, j); when $F_{out}(i, j)=0$, there is no ink spayed out. Hence, the digital halftoning process can be seen as an approximation process to generate the output binary image $F_{out}$ with a dot density distribution that is similar to gray level densities of the input gray-level image $F_{in}$.

Usually, the output image size is larger than the input image size, i.e. $M_o >> M_i$ and $N_o >> N_i$. Without loss of generality, it may be assumed that $M_o = M_i$ and $N_o = N_i$, since one can always interpolate the input image so as to make the input and output images have the same image dimension.

Wavelet Analysis

According to a preferred embodiment of the invention, computation complexity is substantially reduced by approximating the gray-level density of the original image in multiple resolutions based on the 1-D wavelet transform.

Figure 5:
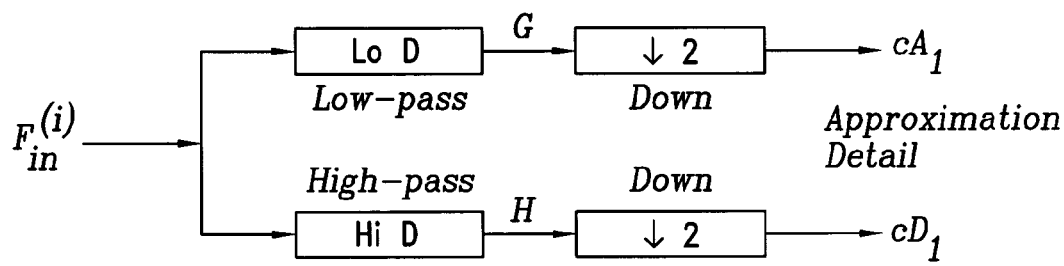
FIG. 5 is a schematic illustration of the first step of a wavelet analysis.

For a one-dimensional (1-D) spatial signal $F_{in}^{(i)}$ of length $N_i$, which corresponds to the $i^{th}$ row of the input gray-level image, the 1-D wavelet analysis consists of at most $\log_2 N$ stages. Starting from $F_{in}^{(i)}$, according to the process illustrated in FIG. 4, the halftoning algorithm obtains two sets of coefficients (i.e. approximation coefficients $cA_1$, and detail coefficients $cD_1$) having size N/2 by convolving $F_{in}^{(i)}$ with a low-pass filter Lo_D for the approximation, and with a high-pass filter H_D for the detail, followed by dyadic decimation. Then, the approximation coefficients $cA_1$ are split into two parts $cA_2$ and $cD_2$ using the same scheme and replacing $F_{in}^{(i)}$ by $cA_1$. This analysis is then iteratively applied in ($\log_2 N$) steps, as illustrated in FIG. 5.

Dot Assignment

The first phase of the halftoning algorithm used by the preferred halftoning process is a top-down dot assignment phase in which dots are assigned a new luminance value based on the wavelet analysis. This phase uses a dot assignment algorithm that calculates the dot density from the coarsest level to the finest level.

The first step in the dot assignment phase is to perform a wavelet transform on the input row to get wavelet coefficients. The reconstruction value of the approximation coefficient at the $k^{th}$ stage ($cA_k$, $k=\log_2 N$) represents the average dot density over the entire row of pixels. Hence, one obtains the total number of dots needed for that row. Since the number of dots is an integer, the average density must be quantized to the nearest integer. Next, the whole row is divided into two sub-intervals, and the reconstruction value of the detail coefficient at the $k^{th}$ stage ($cD_k$, $k=\log_2 N$) indicates the difference in the dot density between these two sub-intervals. Whenever a detail coefficient is included and used for the reconstruction, the current interval is divided into two sub-intervals and the difference in the dot density between those sub-intervals is found. The process is iteratively performed until the finest level that contains a single pixel is reached. It is obvious that the quantization effect will become more and more severe as one moves to the finer levels.

Figure 6A:
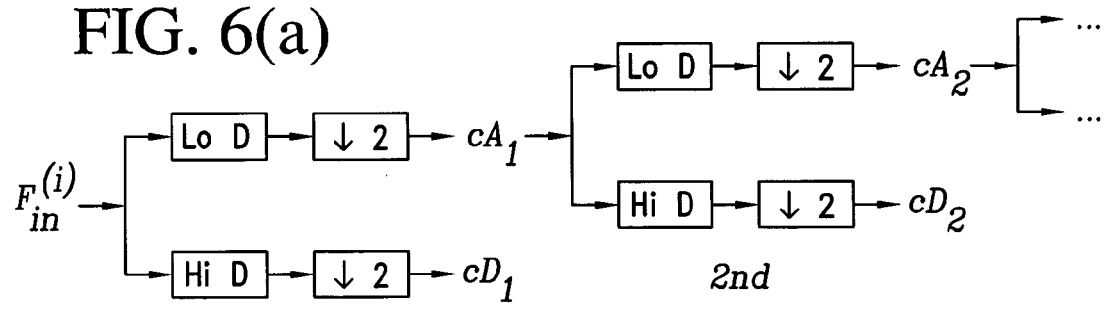
FIG. 6($a$) is a schematic illustration of a multi-scale wavelet filter bank.
Figure 6B:
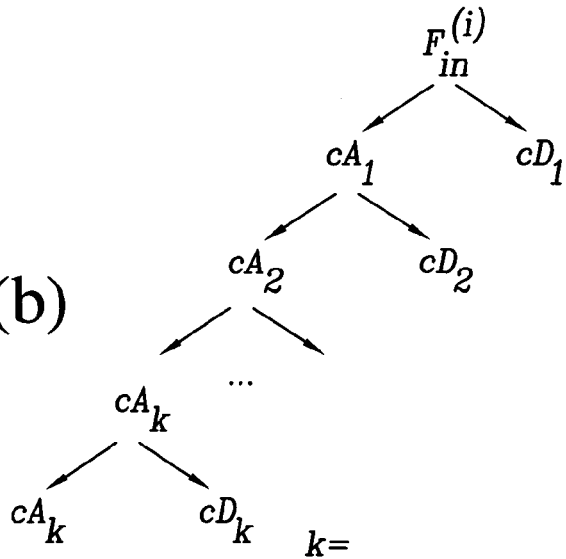
Figure 7A:
FIG. 7($a$) shows an input image to which the halftoning technique of the invention will be applied.
Figure 7B:
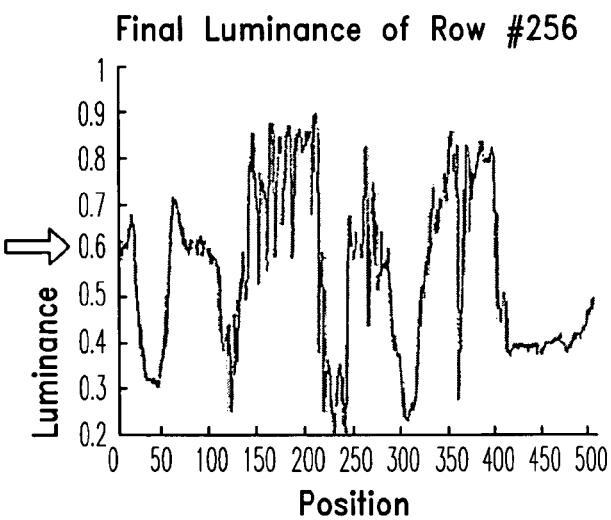
Figure 8:
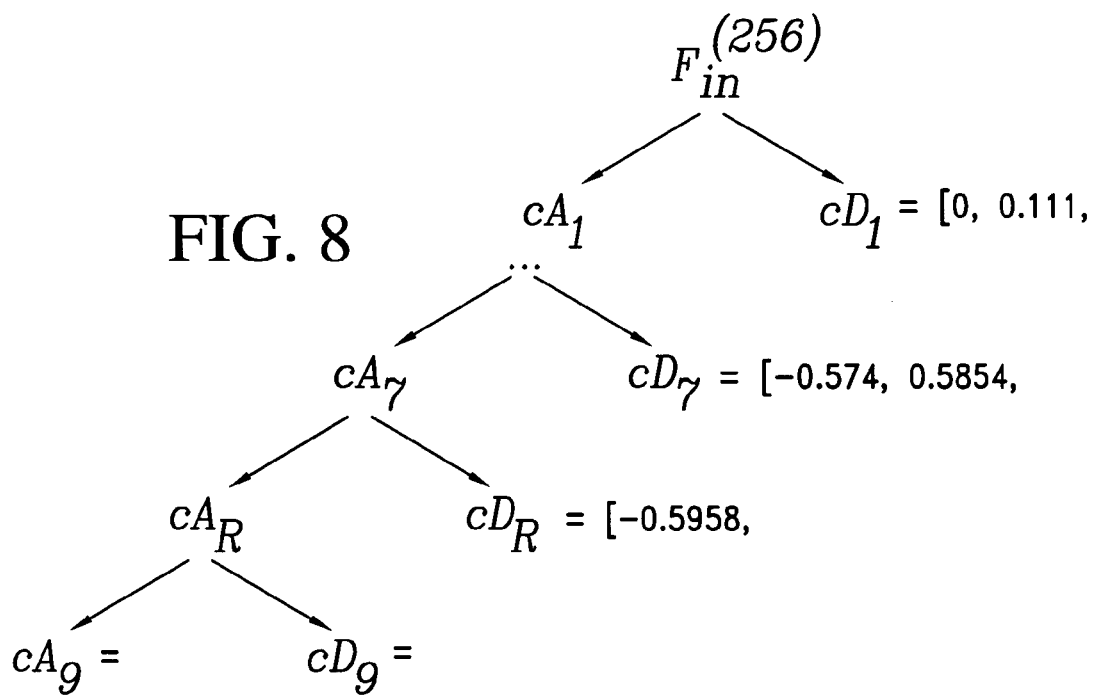
FIG. 8 is a schematic illustration of the application of wavelet analysis to the row of FIG. 7($b$).

FIG. 7 shows the wavelet analysis result with respect to the line shown in FIG. 6 and the Haar wavelet (see FIG. 8) for dot assignment. For presentation simplicity, it is assumed as indicated above that the output image has the same size as the input image ($M_o=M_i=512$, $N_o=N_i=512$). The low-pass and high-pass filter coefficients in FIG. 4 are related to the wavelet functions chosen for the analysis. The Haar wavelet has been chosen for its simplicity. However, it is worthwhile to try other basis functions.

Figure 9:
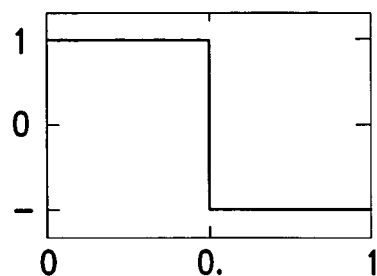
FIG. 9 is a graph illustrating a Haar wavelet.
Figure 10A:
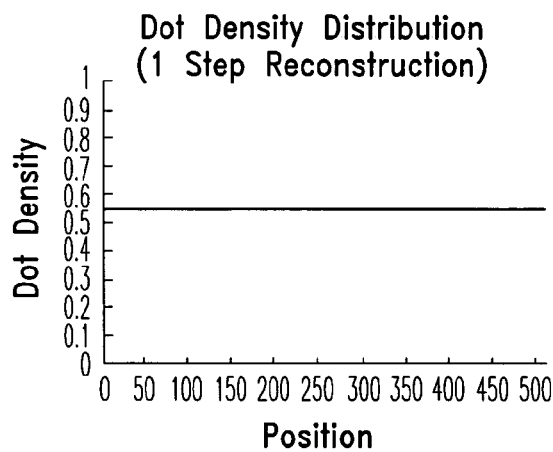
FIGS. 10($a$) to 10($d$) are graphs showing respective dot density distributions are the first four step reconstructions of the preferred halftoning process.
Figure 10B:
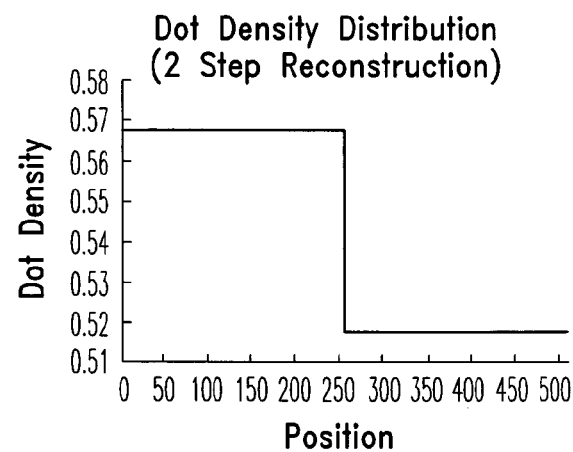
Figure 10C:
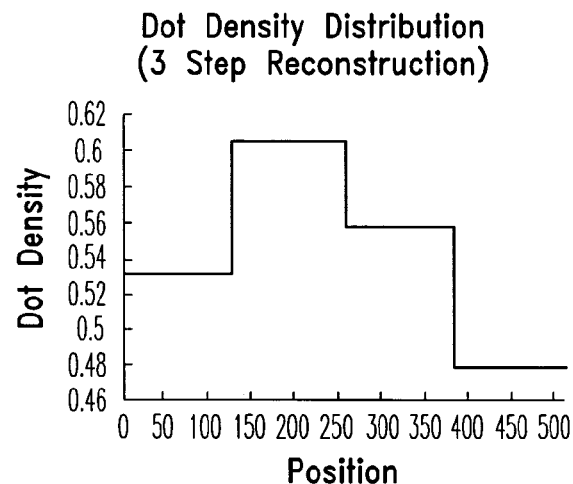
Figure 10D:
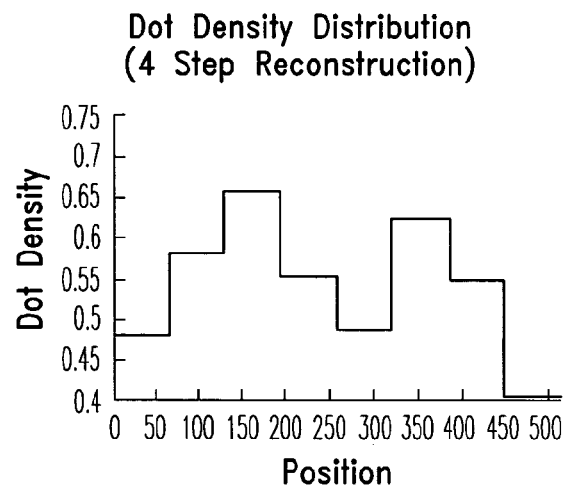
Figure 11:
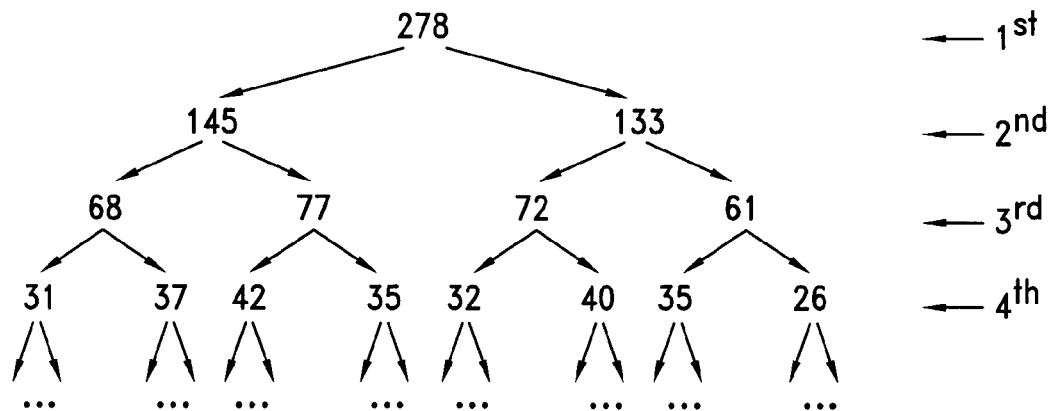
FIG. 11 is a schematic illustration of a dot assignment according to the dot density distributions of FIGS. 10($a$) to 10($d$), applied to the row of FIG. 7($b$).

FIG. 9 shows the first four steps of the reconstruction and interval split process to obtain the dot density distribution. We can assign the number of dots for each interval according to the dot density and the length of that interval. The assignment is processed iteratively starting from the coarsest level (i.e. there is only one interval) to the finest level (i.e. one pixel length). FIG. 10 illustrates the dot assignment tree according to the dot density distribution in FIG. 9.

Assuming that the output image has the same resolution as the original image (i.e. $N_o=N_i$), the basic idea of dot assignment is to approximate the dot density of $\hat{F}_{in}^{(i)}$ in different scales. First, subintervals are constructed with multiple levels of details. There are totally $\log_2 N$ levels. The pixel array $\hat{F}_{in}^{(i)}$ is divided into dyadic intervals of the same length at each level. At the $j^{th}$ level ($0 \leq j \leq \log_2 N$), there are $2^j$ intervals with each of length $N/2^j$. $I_{jk}$ denotes the $k^{th}$ interval of the $j^{th}$ level. Further, $D_{jk}$ and $N_{jk}$ denote the intensity levels in $I_{jk}$ for the input and output images, respectively.

Note that $D_{jk}$ can be calculated from the finest level in a bottom-up fashion via the wavelet transform. At the finest level, each interval only contains one pixel and $D_{jk}=\hat{F}_{in}^{(i)}(k)$. To find $N_{jk}$ to approximate $D_{jk}$ for all j and k, one has:

$$\text{Input intensity: } D_{jk} = \sum_{m=\frac{N(k-1)}{2^j}+1}^{\frac{Nk}{2^j}} \hat{F}_{in}^{(i)}(m) \quad (1)$$

$$\text{Output intensity: } N_{jk} = \begin{cases} \left[\sum_{m=1}^{N} \hat{F}_{in}^{(i)}(m)\right], & j=0 \\ \left[\frac{D_{jk}}{D_{(j-1)\left[\frac{k}{2}\right]}} N_{(j-1)\left[\frac{k}{2}\right]}\right], & \text{others} \end{cases} \quad (2)$$

where [•] denotes the rounding operation to the nearest integer. According to Eq. (2), the dot distribution is calculated recursively from the coarsest level (level 0) to the finest level (level $\log_2 N$) in which each interval only contains one pixel. The final result set $\{N_{jk}, j=\log_2 N, 1 \leq k \leq N\}$ is the output pixel array $G_i$ at the $i^{th}$ row.

Error Diffusion

In the error diffusion phase, the halftoned pixel sequence is compared with the original pixel sequence of the same row, and the quantization error is diffused to the neighbor pixels in the next row.

Mathematically, the quantization error can be written as $$E_i = F_{in}^{(i)} - G_i \quad (3)$$

Then, the error can be diffused to the next pixel array with the following mask:

$$H = \begin{bmatrix} 0 & 0 & 0 & 0 & 0 \\ 0 & 0 & 0 & 0 & 0 \\ 0.1 & 0.2 & 0.4 & 0.2 & 0.1 \end{bmatrix} \leftarrow \text{current row of processing}$$

Those skilled in the art will appreciate that the mask given above is by way of example only, and that different masks may be used in particular contexts. In general, trial and error will be necessary to select the optimal mask.

In addition, those skilled in the art will appreciate that may also be possible to develop a more general diffusion scheme to diffuse the quantization error into multiple rows.

Post-Processing

One problem with the above algorithm is that clusters may sometimes be observed in the output image (i.e. some continuous black or white pixels may appear periodically in a local area). To fix this problem, the dot assignment process can be enhanced by applying the following de-clustering technique at the second finest level $j=\log_2 N-1$. That is, for dyadic intervals $I_{(j+1)(2k-1)}$ and $I_{(j+1)(2k)}$ generated by splitting interval $I_{jk}$, if $|2D_{(j+1)(2k-1)}-D_{jk}| \leq T$, the process demands $D_{(j+1)(2k-1)}=D_{(j+1)(2k)}=D_{jk}/2$, and the threshold T is set at T=0.1.

Complexity Analysis

The computational complexity of the proposed halftoning process is analyzed below. For an image of dimension M and N, Eq. (2) needs to be calculated for each interval $I_{jk}$, where $0 \leq j \leq \log_2 N$ and $1 \leq k \leq 2^j$. Thus, Eq. (2) demands a complexity of $$\sum_{j=0}^{\log_2 N} 2^j = O(N)$$

times. In addition, $D_{jk}$ needs to be calculated for all intervals. Observing that $D_{jk}=D_{(j+1)(2k-1)}+D_{(j+1)(2k)}$, one can build up a binary tree with $D_{Q1}$ as the root and $D_{(log_2N)k}$ ($1 \leq k \leq N$) as leaves. Each pixel $\hat{F}_{in}^{(i)}(k)$ is only involved in one addition. Thus, there are totally O(N) additions. To implement the de-clustering technique, the intervals in the second finest level ($\log_2 N-1$) must be checked and the corresponding $D_{jk}$ modified to the extent necessary, which is of time complexity O(N). Finally, there are M rows in the input image, so the computational complexity for the whole image is O(MN).

Next, we consider the memory requirement. Since the proposed halftoning algorithm processes one row of the input image at a time, the current allocated buffer can be reused for the next row. We have to store the quantized error for the diffusion process. Thus, the memory requirement will be equal to a couple of rows, and the total memory requirement is of O(N).

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention.

For example, any of the specific wavelet analysis, intensity or dot density calculation, and error diffusion techniques described in detail above may be replaced by alternative techniques. In addition, it is noted that the error diffusion phase is optional and may be replaced by other fine-tuning methods.

It is therefore intended that the invention not be limited by the above description or accompanying drawings, but that it be defined solely in accordance with the appended claims.

We claim:

1. A digital halftoning method for rendering a continuous-tone image effect on a printing or display device that can only represent a limited number of output tones, comprising the steps of:
   inputting an image to be rendered on a printing or display device as a continuous-tone image;
   performing a wavelet analysis for one row of pixels of the input image; and
   performing a halftoning algorithm to generate a corresponding output row to transform,
   wherein the halftoning algorithm contains a top-down dot assignment phase in which dots are assigned a new luminance value based on the wavelet analysis, and
   wherein the dot assignment phase comprises, for a one-dimensional spatial signal of length $N$, corresponding to an $i^{th}$ row of an input gray-level image, the steps of:
   a. performing a wavelet transform on the input row to get wavelet coefficients;
   b. obtaining a total number of dots needed for the row based on a reconstruction value $cA_k$ of an approximation coefficient at a $k^{th}$ stage, where $k=\log_2 N$ and $cA_k$ represents the average dot density over the entire row of pixels;
   c. quantizing the average density to a nearest integer;
   d. dividing the row into two sub-intervals;
   e. taking a reconstruction value of a detail coefficient $cD_k$ at the $k^{th}$ stage as a difference in the dot density between these two sub-intervals;
   f. iteratively repeating steps a. through e. until the finest level that contains a single pixel is reached.

2. A method as claimed in claim 1, wherein said step of performing a wavelet analysis comprises the steps of, starting from an ith row of an input image $F_{in}^{(i)}$:
   a. obtaining two sets of coefficients, approximation coefficients $cA_1$, and detail coefficients $cD_1$, having size N/2 by convolving $F_{in}^{(i)}$ with a low-pass filter Lo_D for the approximation coefficients, and with a high-pass filter Hi_D for the detail coefficients, followed by dyadic decimation;
   b. splitting the approximation coefficients $cA_1$ into two parts $cA_2$ and $cD_2$ using the same scheme and replacing $F_{in}^{(i)}$ by $cA_1$; and
   c. iteratively repeating steps a. and b. ($\log_2 N$) times.

3. A method as recited in claim 2, wherein a wavelet used in the wavelet analysis is a Haar wavelet.

4. A method as recited in claim 1, wherein a wavelet used in the wavelet analysis is a Haar wavelet.

5. A method as claimed in claim 1, wherein the dot distribution of step b. is calculated recursively from the coarsest level (level 0) to the finest level (level $\log_2 N$) in which each interval only contains one pixel.

6. A method as claimed in claim 5, further comprising the step of, for an input function in the form of a pixel array $\hat{F}_{in}^{(i)}$ approximating the dot density in different scales, by:
   constructing subintervals with multiple levels of details;
   dividing the pixel array $\hat{F}_{in}^{(i)}$ into dyadic intervals of the same length at each level such that, at the $j^{th}$ level ($0 \leq j \leq \log_2 N$), there are $2^j$ intervals with each of length $N/2^j$, and calculating output intensities $N_{jk}$ to approximate input intensities $D_{jk}$ for all j and k.

7. A method as claimed in claim 6, wherein the input and output intensities are calculated according to the following two formulas:

$$\text{Input intensity: } D_{jk} = \sum_{m=\frac{N(k-1)}{2^j}+1}^{\frac{Nk}{2^j}} \hat{F}_{in}^{(i)}(m) \quad (1)$$

$$\text{Output intensity: } N_{jk} = \begin{cases} \left[\sum_{m=1}^{N} \hat{F}_{in}^{(i)}(m)\right], & j=0 \\ \left[\frac{D_{jk}}{D_{(j-1)\left[\frac{k}{2}\right]}} N_{(j-1)\left[\frac{k}{2}\right]}\right], & \text{others} \end{cases} \quad (2)$$

where [•] denotes the rounding operation to the nearest integer, $I_{jk}$ denotes the $k^{th}$ interval of the $J^{th}$ level, and $D_{jk}$ and $N_{jk}$ denote the intensity levels in $I_{jk}$ for the input and output images, respectively.

8. A method as claimed in claim 6, wherein $D_{jk}$ is calculated from a finest level in a bottom-up fashion via a wavelet transform level, said finest level only containing one pixel such that $D_{jk}=\hat{F}_{in}^{(i)}(k)$.

9. A method as claimed in claim 6, wherein a final result set $\{N_{jk}, j=\log_2 N, 1 \leq k \leq N\}$ is an output pixel array $G_i$ at the $i^{th}$ row.

10. A method as recited in claim 1, wherein a wavelet used in the wavelet analysis is a Haar wavelet.

11. A method as recited in claim 1, wherein, to fine tune the halftoned images and compensate for errors generated by the implicit quantization, the method of performing the halftoning algorithm includes an error diffusion phase in which the dot assignment is compared with the original luminance value and a quantization error is diffused to the pixel in the next one or several lines.

12. A method as claimed in claim 10, wherein during the error diffusion phase, the halftoned pixel sequence is compared with the original pixel sequence of the same row, and the quantization error is diffused to the neighbor pixels in the next line.

13. A method as claimed in claim 10, wherein the quantization error is $$E_i = F_{in}^{(i)} - G_i \qquad (3)$$

where is $F_{in}^{(i)}$ is an input pixel array and $G_j$ is an output pixel array, and wherein the error is diffused to the next pixel array with the following mask H for a current row of processing:

$$H = \begin{bmatrix} 0 & 0 & 0 & 0 & 0 \\ 0 & 0 & 0 & 0 & 0 \\ 0.1 & 0.2 & 0.4 & 0.2 & 0.1 \end{bmatrix}.$$

14. The method as claimed in claim 1, further comprising the post-processing steps of applying, at the second finest level $j=\log_2 N-1$, the following de-clustering technique: for dyadic intervals $I_{(j+1)(2k-1)}$ and $I_{(j+1)(2k)}$ generated by splitting interval $I_{jk}$, if $|2D_{(j+1)(2k-1)} - D_{jk}| \leq T$, setting $D_{(j+1)(2k-1)} = D_{(j+1)(2k)} = D_{jk}/2$, and the threshold T at T=0.1.

* * * * *